US012718243B2

(12) United States Patent
Bostock

(10) Patent No.: US 12,718,243 B2
(45) Date of Patent: Aug. 25, 2026

(54) COMMON TRANSACTION ID

(71) Applicant: Visa International Service Association, San Francisco, CA (US)

(72) Inventor: James McDonald Bostock, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 90 days.

(21) Appl. No.: 18/511,632

(22) Filed: Nov. 16, 2023

(65) Prior Publication Data

US 2025/0165973 A1 May 22, 2025

(51) Int. Cl.

*G06Q 30/00* (2023.01)
*G06Q 20/02* (2012.01)
*G06Q 20/38* (2012.01)
*G06Q 20/40* (2012.01)

(52) U.S. Cl.

CPC ....... *G06Q 20/4014* (2013.01); *G06Q 20/027* (2013.01); *G06Q 20/3827* (2013.01); *G06Q 20/4016* (2013.01); *G06Q 2220/00* (2013.01)

(58) Field of Classification Search

None
See application file for complete search history.

(56) References Cited

U.S. PATENT DOCUMENTS

2018/0181953 A1* 6/2018 Lacoss-Arnold ..... H04L 9/0869
2019/0073666 A1* 3/2019 Ortiz ................. G06Q 20/3674
2020/0250747 A1* 8/2020 Padmanabhan ...... G06Q 20/065
2021/0304206 A1* 9/2021 Juneja .................. G06Q 20/206
2021/0350382 A1* 11/2021 Lopes .................... G06Q 20/14
2022/0398583 A1* 12/2022 Crudele ............... G06Q 40/125
2023/0196398 A1* 6/2023 Tay .................... G06Q 30/0283
705/14.23
2024/0013168 A1* 1/2024 Oei ........................ G06Q 20/06
2024/0020648 A1* 1/2024 Robinson ........... G06Q 10/1057
2025/0005682 A1* 1/2025 Mueller-Eberstein ........................ G06Q 40/12

OTHER PUBLICATIONS

Mankar; Association Rules Generation of Outsourced Transaction Data with Privacy-Preserving; ICOSEC 2020, pp. 898-903; 2020.*
Xu; Understanding the Business of Online Affiliate Marketing; IEEE 2025; 10 pages; 2025.*

* cited by examiner

*Primary Examiner* — Radu Andrei
(74) *Attorney, Agent, or Firm* — K&L Gates LLP

(57) ABSTRACT

The present disclosure provides devices, systems, and methods for sharing transaction data across entities of a payment network based on a common transaction identifier (ID). For example, a transaction service provider system can process a first transaction based on first transaction data, receive second transaction data for a second transaction processed by an affiliate system, and generate a confidence score representing a likelihood that the first transaction and the second transaction are the same transaction. The transaction service provider system can generate a common transaction ID for the first transaction and the second transaction based on the first transaction data. The transaction service provider system can determine the confidence score satisfies a predetermined threshold and send a request for additional data related to the second transaction to the affiliate system based on the common transaction ID.

17 Claims, 8 Drawing Sheets

COMMON TRANSACTION ID

TECHNICAL FIELD

At least some aspects of the present disclosure relate to sharing transaction-related data between various entities of a payment network, and more particularly, to sharing transaction-related data based on a common transaction identifier (ID).

BACKGROUND

Various entities can be involved in processing transactions across a payment network. For example, a transaction initiated between a consumer and a merchant may be processed by entities including a payment gateway system, an authentication service system, an acquirer system, an issuer system, a transaction service provider system, and/or various other affiliate systems.

These entities may implement varying approaches for evaluating transactions, storing and organizing data related to transactions, and deriving information based on the stored data. For example, a payment gateway system and a transaction service provider system each may implement its own fraud detection tool for evaluating a particular transaction. As another example, the payment gateway system and the transaction service provider system each may maintain a merchant database with information related to merchants involved in processed transactions. In some instances, the payment gateway system's fraud detection tool may be more accurate than the transaction service provider's fraud detection system, or vice versa. Likewise, the level of detail related to merchant data stored in the payment gateway system's merchant database may be greater than that of the transaction service provider's merchant database, or vice versa.

It can be beneficial for various entities of a payment network to leverage their combined resources by sharing transaction-related data. For example, it may be beneficial for a transaction service provider system to consider not only the results of its fraud detection tool but also the result of the payment gateway system's fraud detection tool to achieve increased accuracy when determining whether to approve or deny a transaction. Further, it may be beneficial for the transaction service provider system to improve its merchant database based on information stored in the payment gateway system's merchant database.

However, it can be difficult to share transaction-related data between entities of a payment network because the various entities may use different transaction identifiers (IDs) for transaction data. For example, for the same transaction between a consumer and a merchant, a transaction service provider and a payment gateway may each use different transaction IDs. Thus, if the transaction service provider system requests transaction data from the payment gateway system by referencing the transaction service provider's transaction ID, the payment gateway system may not be able to determine which transaction the transaction service provider system is referencing. Therefore, the payment gateway system may not be able to share the requested transaction data.

Accordingly, there is a need for devices, systems, and methods for sharing transaction-related data across various entities of a payment network. The present disclosure provides various solutions that implement a common transaction ID.

SUMMARY

According to one aspect, the present disclosure provides a transaction service provider system. The transaction service provider system can include a confidence model, a common transaction ID generator, and a decision engine. The confidence model is to receive first transaction data for a first transaction being processed by the transaction service provider system, receive second transaction data for a second transaction being processed by an affiliate system, and generate a confidence score based on the first transaction data and the second transaction data. The confidence score represents a likelihood that the first transaction and the second transaction are the same transaction. The common transaction ID generator is to generate a common transaction ID for the first transaction and the second transaction based on the first transaction data. The decision engine is to determine the confidence score satisfies a predetermined threshold and send a request for additional data related to the second transaction to the affiliate system. The request comprises the common transaction ID.

According to another aspect, the present disclosure provides a computer-implemented method. The method can include retrieving, by a first server, first transaction attributes. The first transaction attributes correspond to a first transaction being processed by the first server. The method can further include receiving, by the first server, second transaction attributes from a second server. The second transaction attributes correspond to a second transaction being processed by the second server. The method can further include generating, by the first server, a confidence score by applying the first transaction attributes and the second transaction attributes to a machine learning model. The confidence score represents a likelihood that the first transaction and the second transaction are the same transaction. The method can further include accepting, by the first server, that the first transaction and the second transaction are the same transaction based on the confidence score satisfying a predetermined threshold. The method can further include generating, by the first server, a common transaction identifier (ID) for the first transaction and the second transaction by applying the first transaction attributes or the second transaction attributes or a combination thereof to a hashing algorithm. The method can further include sending, by the first server, a request for additional data related to the second transaction to the second server, wherein the request references the common transaction ID.

According to yet another aspect, the present disclosure provides a computer-implemented method. The method can include receiving, by a first affiliate server, a request to process a first transaction from a merchant server. The request comprises first transaction data. The method can further include sending, by the first affiliate server, the first transaction data to a confidence model and receiving, by the first affiliate server, a confidence score from the confidence model. The confidence score represents a likelihood that the first transaction and a second transaction being processed by a second affiliate server are the same transaction. The method can further include determining, by the first affiliate server, that the confidence score satisfies a predetermined threshold and generating, by the first affiliate server, a common transaction identification (ID) for the first transaction and the second transaction based on the first transaction data. The method can further include sending, by the first affiliate server, a request for additional data related to the second transaction to the second affiliate server. The request references the common transaction ID. The method can further include receiving, by the first affiliate server, the additional data related to the second transaction and approving or denying, by the first affiliate server, the first transaction based on the additional data related to the second transaction.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, together with the detailed description below, are incorporated in and form part of the specification, and serve to further illustrate aspects of concepts that include the claimed disclosure and explain various principles and advantages of those aspects.

Figure 1:
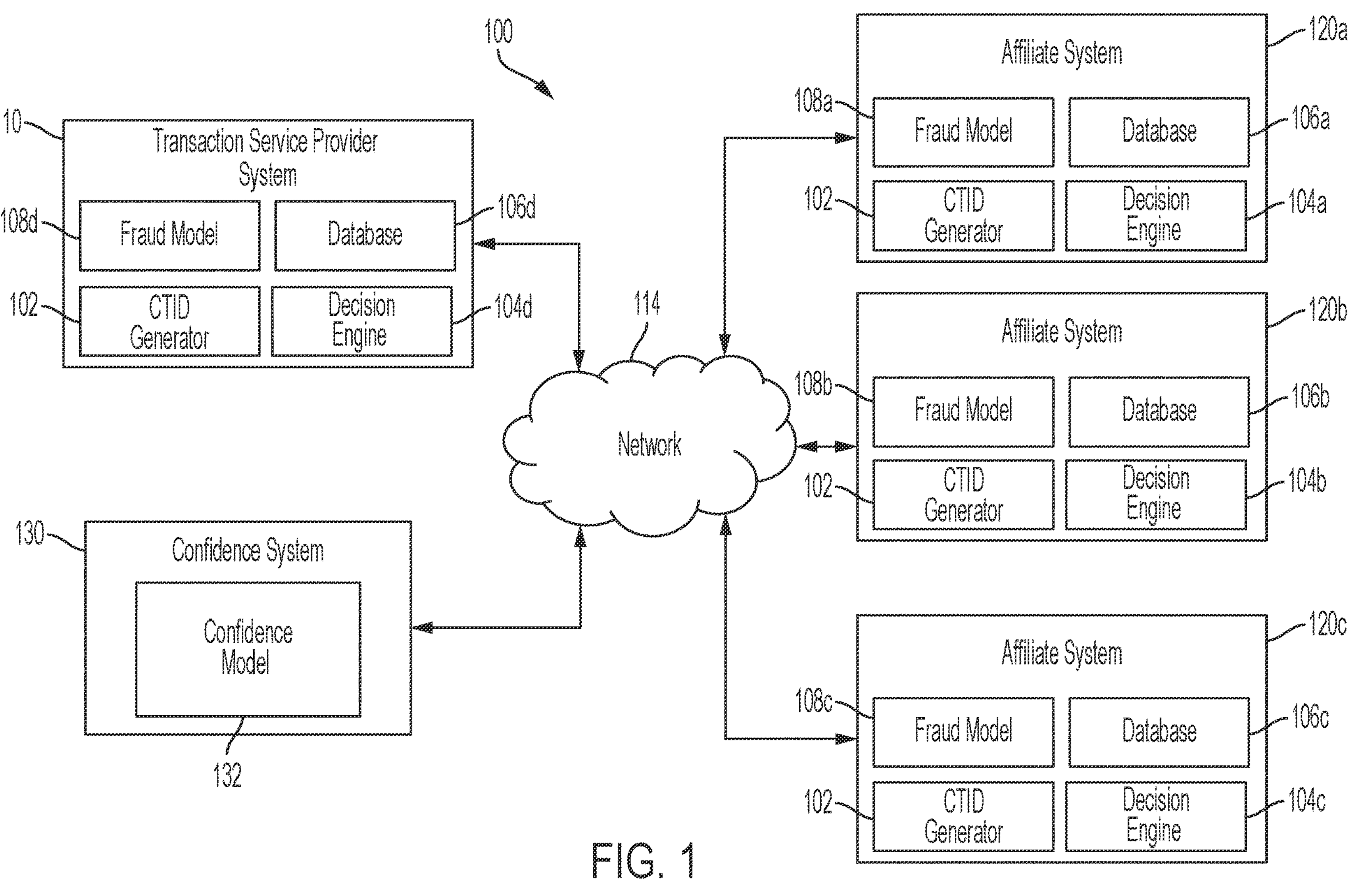

The apparatuses and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 is a block diagram of a payment network system for sharing transaction-related data based on a common transaction ID, according to at least one aspect of the present disclosure.

Figure 2:
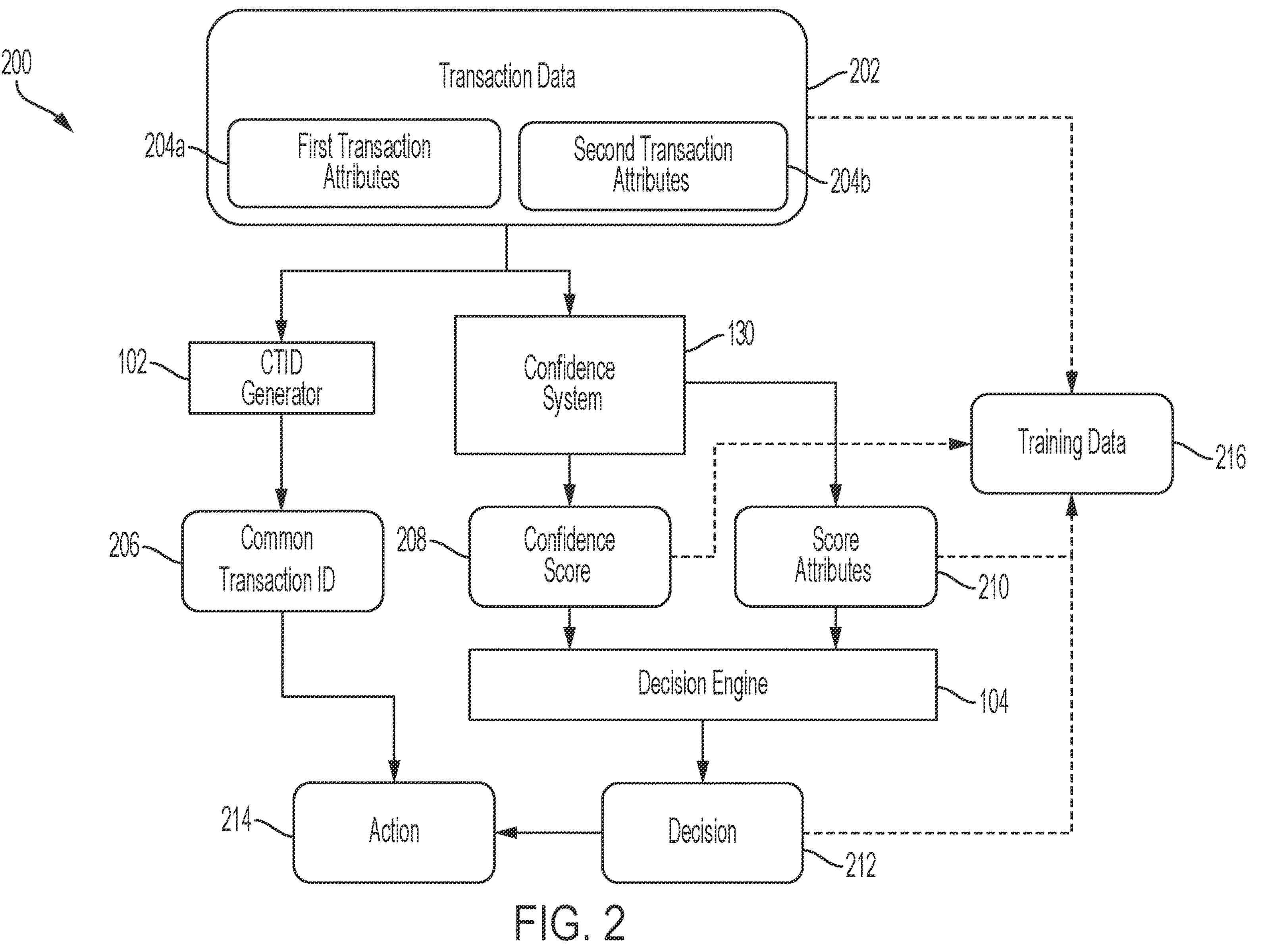

FIG. 2 is a flow diagram of a method for implementing an action based on a common transaction ID, according to at least one aspect of the present disclosure.

Figure 3:
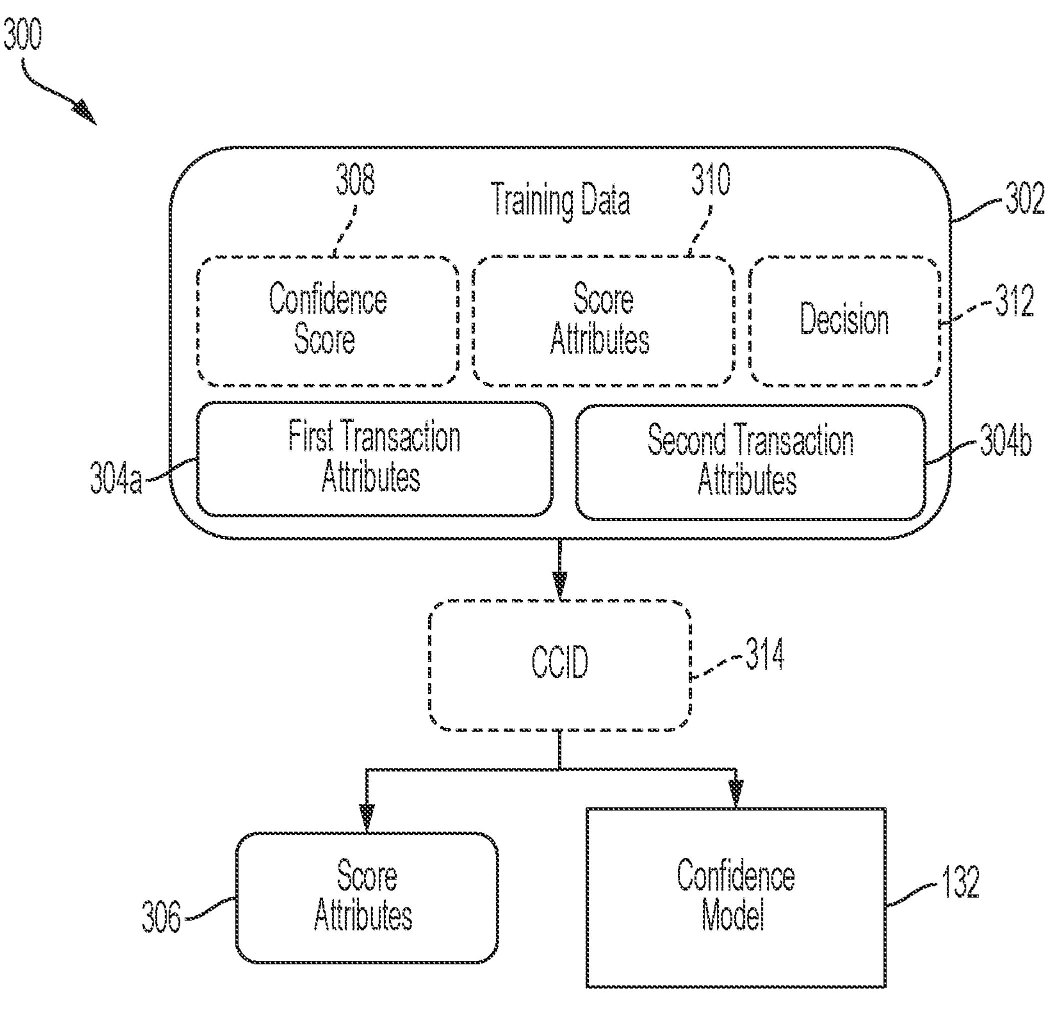

FIG. 3 is a flow diagram of a method for training a confidence model, according to at least one aspect of the present disclosure.

Figure 4:
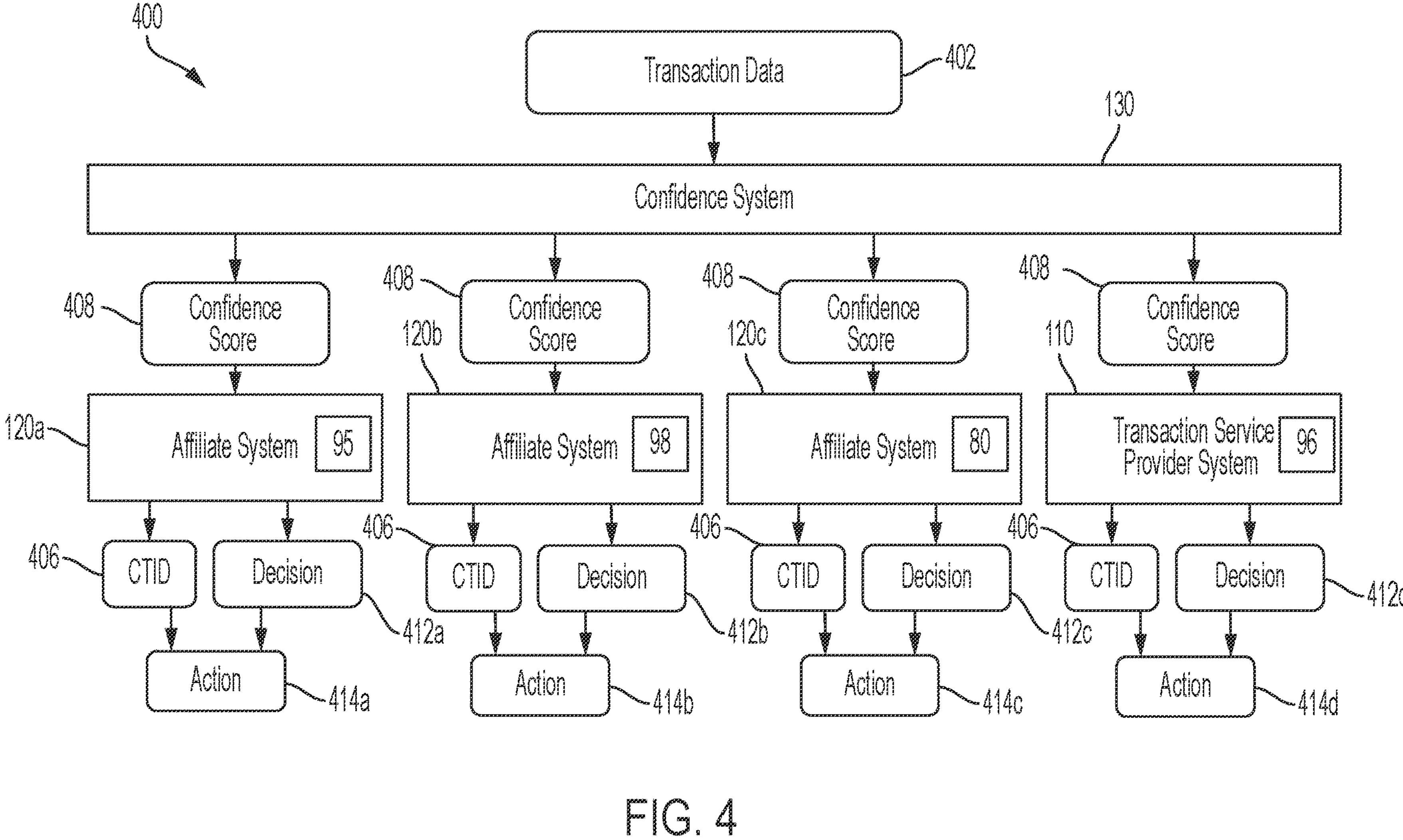

FIG. 4 is a flow diagram of a method for multiple entities of a payment network to implement an action based on a common transaction ID, according to at least one aspect of the present disclosure.

Figure 5:
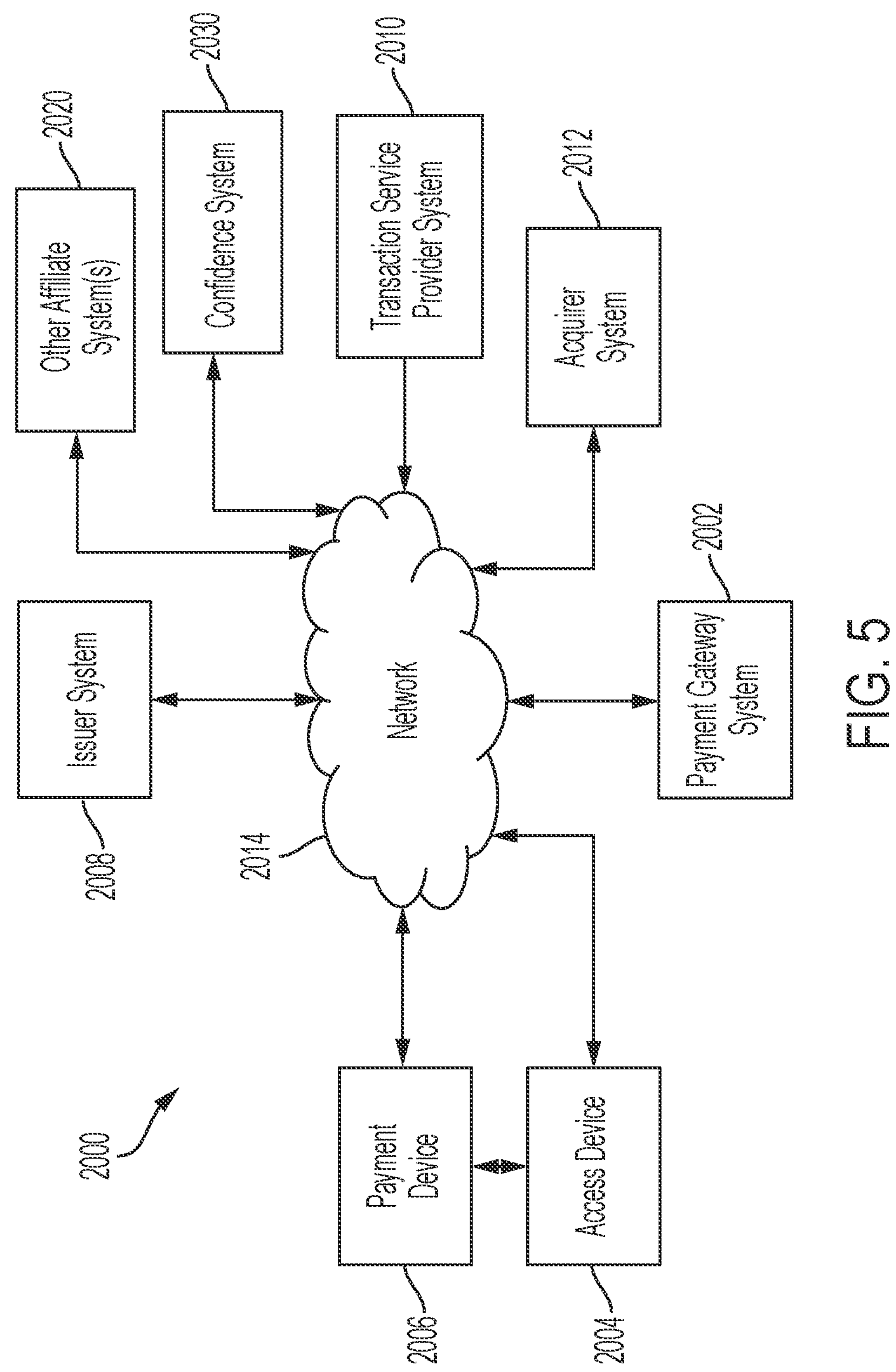

FIG. 5 is a block diagram of a payment network system, according to at least one aspect of the present disclosure.

Figure 6:
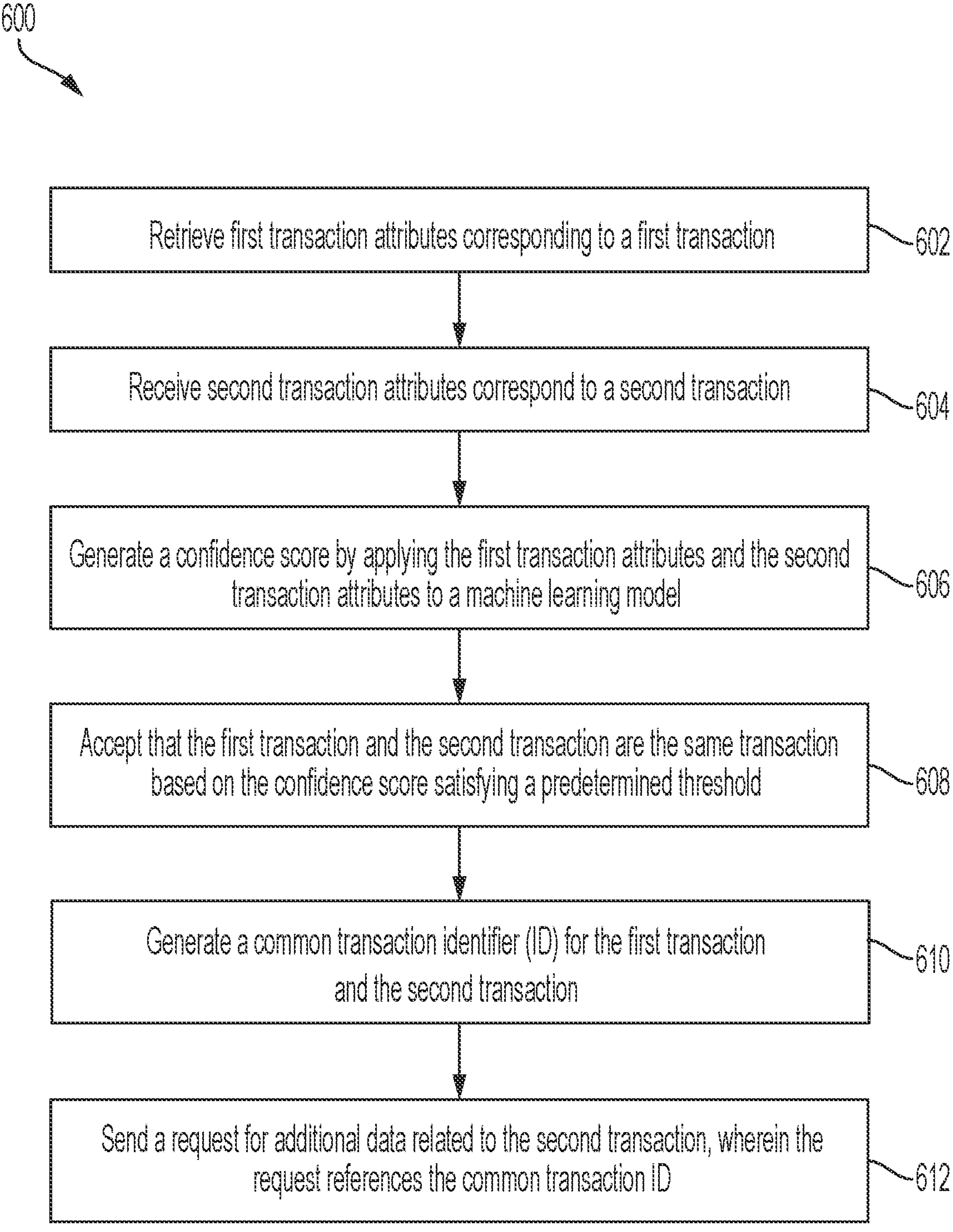

FIG. 6 is a flow diagram of a method for sharing transaction-related data based on a common transaction ID.

Figure 7:
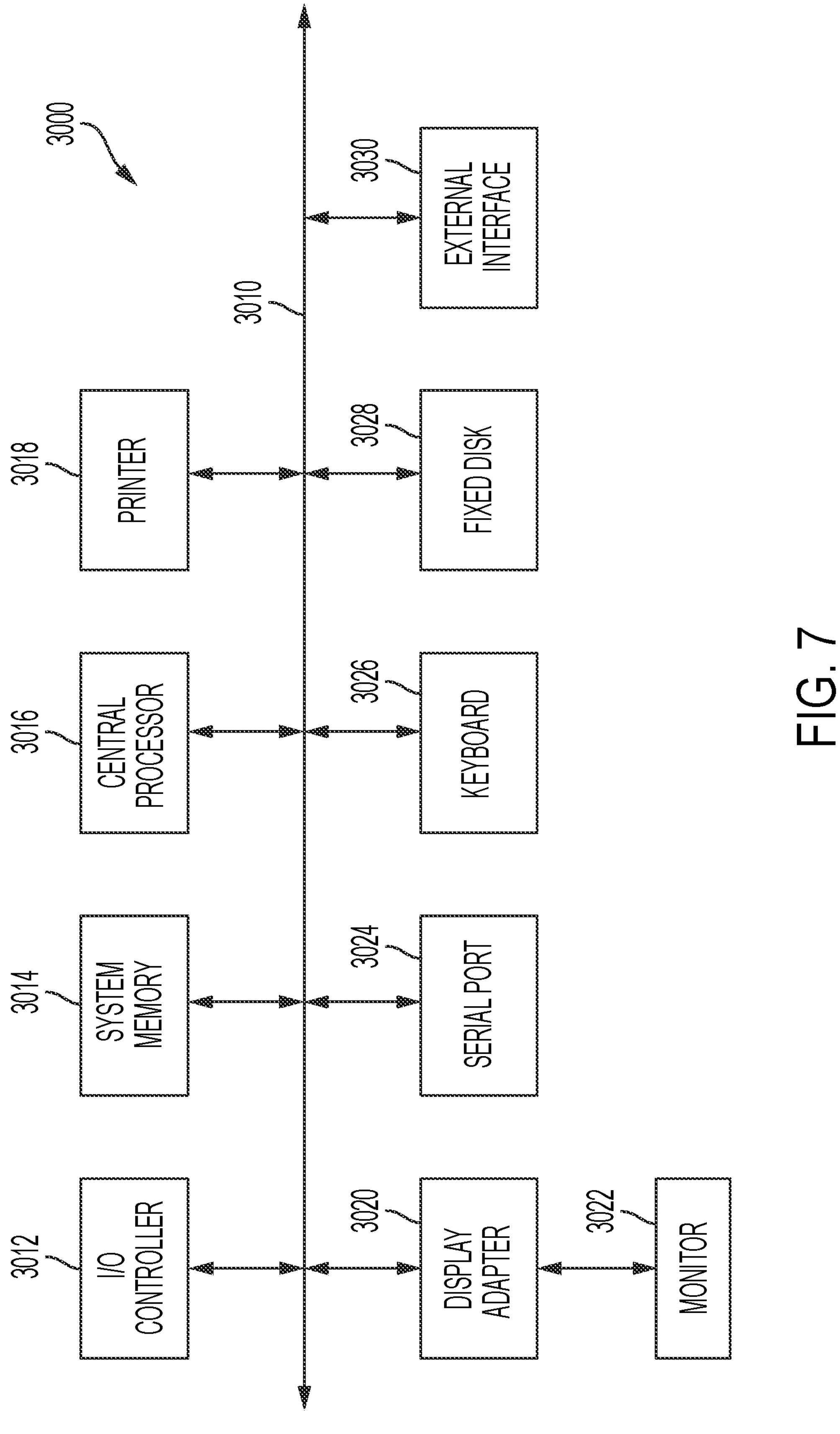

FIG. 7 is a block diagram of a computer apparatus with data processing subsystems or components, according to at least one aspect of the present disclosure.

Figure 8:
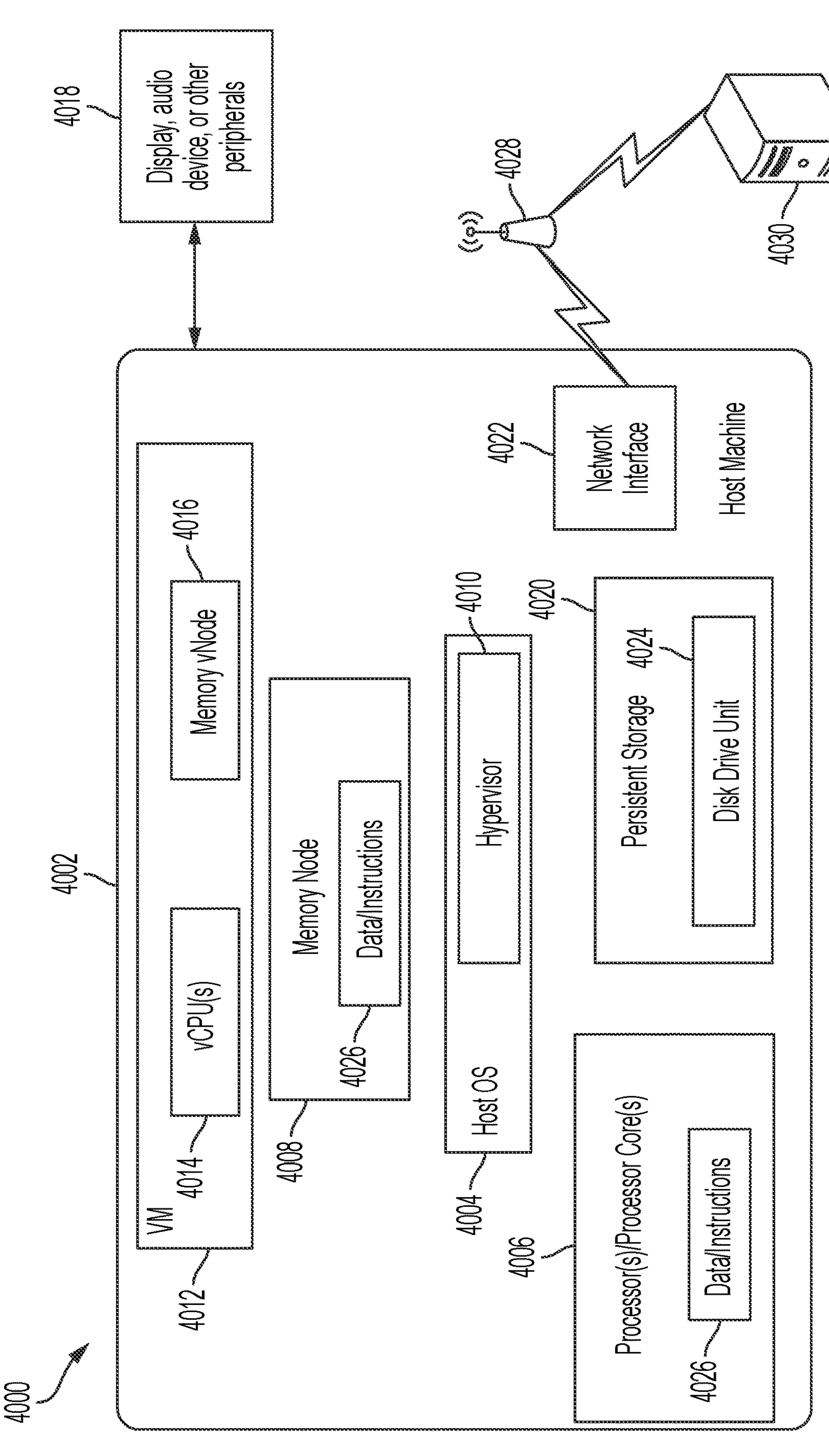

FIG. 8 is a diagrammatic representation of an example system that includes a host machine, according to at least one aspect of the present disclosure.

Corresponding reference characters indicate corresponding parts throughout the several views. The exemplifications set out herein illustrate various aspects of the present disclosure, in one form, and such exemplifications are not to be construed as limiting the scope of the disclosure in any manner.

DESCRIPTION

Before explaining various forms of devices, systems, and methods of sharing transaction-related data based on a common transaction ID, it should be noted that the illustrative forms disclosed herein are not limited in application or use to the details of construction and arrangement of components illustrated in the accompanying drawings and description. The illustrative forms may be implemented or incorporated in other forms, variations, and modifications, and may be practiced or carried out in various ways. Further, unless otherwise indicated, the terms and expressions utilized herein have been chosen for the purpose of describing the illustrative forms for the convenience of the reader and are not for the purpose of limitation thereof. Also in the following description, it is to be understood that terms such as "forward," "rearward," "left," "right," "above," "below," "upwardly," "downwardly," and the like are words of convenience and are not to be construed as limiting terms.

As described above, it can be beneficial for various entities of a payment network to leverage their combined resources by sharing transaction-related data. For example, it may be beneficial for a first entity of the payment network to consider not only the results of its fraud detection tool but also the result of a second entity's fraud detection tool to achieve increased accuracy when determining whether to approve or deny a transaction. As another example, it may be beneficial for the first entity to improve or otherwise update its database of transaction-related data based on information stored in the second entity's database.

However, as also described above, it can be difficult to share transaction-related data between entities of a payment network because the various entities may use different transaction identifiers (IDs) for organizing transaction data. For example, for a particular transaction, the entities may generate their respective transaction IDs based on at least some of the same transaction attributes (e.g., a primary account number (PAN), a transaction amount, a currency, a date and time, an authentication code). However, each entity may employ a different method or format for generating the transaction IDs, therefore resulting in the entities employing different transaction IDs for the same transaction. In other words, for a given transaction, a first entity of the payment network and a second entity of the payment network may generate a different transaction ID. Thus, the first entity and the second entity may not be able to request information related to the transaction from each other by referencing their respective transaction IDs. Accordingly, there is a need for devices, systems, and methods for sharing transaction-related data across various entities of a payment network.

The present disclosure provides various devices, systems, and methods for sharing transaction-related data based on a common transaction ID. For example, according to some aspects of the present disclosure, a first entity of a payment network (e.g., a transaction service provider server, an affiliate server, an issuer server) can process a first transaction based on first transaction data and a second entity of the payment network can process a second transaction based on second transaction data. The first entity sends the first transaction data to a confidence model and the second entity sends the second transaction data to the confidence model. Based on the first transaction data and the second transaction data, the confidence model can generate a confidence score indicating the likelihood that the first transaction and the second transaction are actually the same transaction. The first entity can generate a common transaction ID for the first transaction and the second transaction based on the first transaction data. The second entity can generate a common transaction ID for the first transaction and the second transaction based on the second transaction data. Based on the confidence score satisfying a first predetermined threshold, the first entity can send a request for additional data related to the second transaction to the second entity by referencing the common transaction ID. Similarly, based on the confidence score satisfying a second predetermined threshold, the second entity can send a request for additional data related to the first transaction to the first entity by referencing the common transaction ID.

In some aspects, the first transaction data and the second transaction data can each define transaction attributes. The types of transaction attributes defined by the first transaction data and the second transaction data may include a primary account number (PAN), a transaction amount, a currency, a date and time, an authentication code, a transaction service provider transaction identifier (ID), and/or a merchant code. However, even though the first transaction and the second transaction may be the same transaction, the first transaction data and the second transaction data can include different transaction attributes. For example, the date and time recorded for the first transaction may be slightly different from the date and time recorded for the second transaction. As another example, some of the transaction attributes present in the first transaction data (e.g., transaction service provider transaction identifier [ID]) may not be present in the second transaction data. The confidence model can analyze the first transaction data and the second transaction data to determine the likelihood that the first transaction and the second transaction are the same transaction, accounting for the differences that may exist between the attributes defined by the first transaction data and the attributes defined by the second transaction data. In one aspect, the confidence model can include a machine-learning model trained based on labeled data. The confidence model can generate a confidence score representing the likelihood (e.g., probability) that the first transaction and the second transaction are the same transaction.

As noted above, in some aspects, the first entity can request additional data related to the second transaction from the second entity based on the confidence score satisfying a first predetermined threshold. Likewise, the second entity can request additional data related to the first transaction from the first entity based on the confidence score satisfying a second predetermined threshold. The first predetermined threshold and the second predetermined threshold may be different. For example, the first entity may be willing to accept a greater risk related to sharing data based on a common transaction ID when the first and second transactions are actually different and may therefore employ a first predetermined threshold that is less than the second predetermined threshold employed by the second entity, or vice versa. Additionally or alternatively, the first predetermined threshold and/or the second predetermined threshold may depend on the value of the transaction. For example, the first entity and/or the second entity may employ a rule-based decision engine (e.g., algorithm) that determines the predetermined threshold based on the transaction value. Because the first entity's and/or the second entity's willingness to risk receiving incorrect data related to a transaction may decrease as the transaction value increases, the decision engine may require increasingly higher predetermined thresholds as the transaction value increases.

In some aspects, the additional data requested by the entities using the common transaction ID can include a risk score. The risk score can represent a probability of the corresponding transaction being fraudulent. The entities can implement an action based on receiving the risk score, such as approving or denying the transaction based on the risk score. For example, the first entity may apply the first transaction data to a first fraud model to generate a first risk score. The second entity may apply the second transaction data to a second fraud model to generate a second risk score. The first fraud model and the second fraud model may be different and therefore may generate different risk scores for the same transaction. Based on reference to the common transaction ID, the first entity can request the second risk score from the second entity and the second entity can request the first risk score from the first entity. The first entity can approve or deny the first transaction, in real time (e.g., as the first transaction as being processed), based on the first risk score and/or the second risk score. Similarly, the second entity can approve or deny the second transaction, in real time, based on the first risk score and/or the second risk score.

The devices, systems, and methods provided herein can provide numerous benefits. For example, by implementing a common transaction ID, various entities of a payment network are able to leverage their combined resources and share transaction-related data. Furthermore, according to various aspects, the devices, systems, and methods for sharing transaction-related data based on a common transaction ID provided herein can be applied to multiple different types of payment networks (e.g., Visa, MasterCard, American Express). In other words, various aspects, the devices, systems, and methods provided herein can be payment network agnostic. Thus, the common transaction IDs disclosed herein may serve as a standardized transaction ID that can be employed across different payment networks. This may be beneficial, for example, to entities such as issuers, acquirers, and payment gateways that may operate within multiple different payment network environments.

As yet another example, the devices, systems, and methods disclosed herein can incorporate the generation confidence scores and/or common transaction IDs into a practical application. By using the common transaction ID, various entities of a payment network can share their respective risk scores generated for a particular transaction. Thus, a first entity may deny a transaction (e.g., in real time) based on a risk score generated by a second entity, thereby preventing fraud.

FIG. 1 is a block diagram of a payment network system 100 for sharing transaction-related data based on a common transaction ID, according to at least one aspect of the present disclosure. The payment network system 100 can include a transaction service provider system 110 and one or more than one affiliate system 120 (e.g., affiliate system 120*a*, affiliate system 120*b*, affiliate system 120*b*; sometimes collectively referred to as the affiliate systems 120). Although FIG. 1 depicts three affiliate systems 120, the payment network system 100 can include any positive integer number of affiliate systems 120.

A "payment network" may refer to an electronic payment system used to accept, transmit, or process transactions made by payment devices for money, goods, or services. The payment network may transfer information and funds among issuers, acquirers, merchants, and payment device users. One illustrative non-limiting example of a payment network is VisaNet, which is operated by Visa, Inc.

A "system" may refer to one or more computing devices or combinations of computing devices (e.g., processors, servers, client devices, software applications, components of such, and/or the like).

A "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa, MasterCard, American Express, or any other entity that processes transactions. As used herein "transaction service provider system" may refer to one or more systems operated by or operated on behalf of a transaction service provider, such as a transaction service provider system executing one or more software applications associated with the transaction service provider. In some non-limiting aspects, a transaction service provider system may include one or more server computers with one or more processors and, in some non-limiting aspects, may be operated by or on behalf of a transaction service provider.

Referring again to FIG. 1, each of the affiliate systems 120 can correspond to any type of entity that processes transactions across a payment network. For example, an affiliate system 120 may be a payment gateway system (e.g., the payment gateway system 2002 of FIG. 5), an authentication service provider system, an acquirer system (e.g., the acquirer system 2012 of FIG. 5), or an issuer system (e.g., the issuer system 2008 of FIG. 5). The affiliate systems 120 can include any number and combination of different types of affiliate systems.

The transaction service provider system 110 and the affiliate systems 120 can communicate via the network 114. The network 114 may include one or more wired and/or wireless networks. For example, the network 114 may include a cellular network (e.g., a long-term evolution (LTE) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The transaction service provider system 110 can include a common transaction ID (CTID) generator 102. Similarly, each of the affiliate systems 120 can include a CTID generator 102. The CTID generator 102 can generate a transaction ID based on a set of transaction attributes. For example, when processing a transaction, the transaction service provider system 110 and/or any of the affiliate systems 120 can receive transaction data corresponding to the transaction. The transaction data can include transaction attributes such as, for example, a primary account number (PAN), a transaction amount, a currency, a date and time, an authentication code, and/or a merchant code. The CTID generator 102 can generate a transaction ID based on the PAN, the transaction amount, the currency, the date and time, the authentication code, and/or the merchant code. According to some aspects, the CTID generator 102 can employ a hashing algorithm (e.g., hashing function) to generate the transaction ID based on the transaction attributes. The transaction ID generated by the CTID generator 102 can be an alphanumeric string.

Each CTID generator 102 can be the same across the transaction service provider system 110 and the affiliate systems 120. Thus, based on a given set of transaction attributes for a particular transaction, the CTID generator 102 of the transaction service provider system 110 and the CTID generator 102 of each of the affiliate systems 120 can generate the same transaction ID (e.g., a common transaction ID). Accordingly, the CTID generator 102 can enable the various entities of the payment network system 100 to generate common transaction IDs based on a standardized format. Further, because each entity is generating common transaction IDs based on a standardized format, the entities can reference the common transaction IDs to request and receive transaction-related data from one another. For example, with reference to a common transaction ID generated by the CTID generator 102, the entities can request and share stored information related to the corresponding transaction (e.g., data stored in a database 106). As another example, with reference to a common transaction ID generated by the CTID generator 102, the entities can request and share risk scores related to the corresponding transaction (e.g., risk scores indicating a probability of fraud generated by a fraud model 108, as explained further herein).

Referring still to FIG. 1, the payment network system 100 can include a confidence system 130. The confidence system 130 can include a confidence model 132. The confidence model 132 can determine a likelihood (e.g., probability) that a first transaction and a second transaction are the same transaction based on transaction data (e.g., transaction attributes) corresponding to the first transaction and transaction data corresponding to the second transaction. As explained further below with respect to FIG. 3, in some aspects, the confidence model 132 can be a trained machine-learning model.

As noted above, transaction data for a particular transaction can include transaction attributes such as a PAN, a transaction amount, a currency, a date and time, an authentication code, and/or a merchant code. However, even though a first transaction being processed by the transaction service provider system 110 and a second transaction being processed by an affiliate system 120*a* may be the same transaction, the transaction data for the first transaction and the transaction data for the second transition can include different transaction attributes. The difference in transaction attributes may be related to the differences in how and/or when the various entities of the payment network system 100 process a given transaction. For example, the date and time recorded for the first transaction processed by the transaction service provider system 110 may be slightly different from the date and time recorded for the second transaction processed by the affiliate system 120*a*, even though the first transaction and the second transaction are the same transaction. As another example, some of the transaction attributes present in the first transaction data may not be present in the second transaction data. The confidence model 132 can generate a confidence score indicating the likelihood that the first transaction and the second transaction are the same transaction based on the similarities and/or differences in the corresponding transaction data.

In some aspects, the confidence score can be a numeric value (e.g., 0-100, 0.0-1.0) indicating the probability that a first transaction and a second transaction are the same transaction.

In some aspects, the confidence system 130 can be a stand-alone, centralized system that is separate from the transaction service provider system 110 and the affiliate systems 120. In other aspects, the confidence system 130 can be included in any one or more than one of the transaction service provider system 110 and the affiliate systems 120. For example, various entities of the payment network system 100 can deploy their own instance or on-line implementation of the confidence system 130.

Referring still to FIG. 1, the transaction service provider system 110 and each of the affiliate systems 120 can include a decision engine 104 (e.g., decision engine 104*a*, decision engine 104*b*, decision engine 104*c*, decision engine 104*d*; sometimes collectively referred to as the decision engines 104). The transaction service provider system 110 and each of the affiliate systems 120 can employ their respective decision engines 104 to determine whether to take an action related to a particular transaction, using a common transaction ID, based on the confidence score generated by the confidence model 132.

For example, for a first transaction being processed by the transaction service provider system 110, the transaction service provider system 110 may have use for additional transaction-related data generated by the affiliate system 120*a*. This additional transaction-related data may be stored in the database 106*a* of the affiliate system 120*a*. However, the affiliate system 120*a* may internally reference the first transaction differently than the transaction service provider system 110 (e.g., the affiliate system 120*a* may internally reference the transaction as a second transaction). Furthermore, the transaction attributes for the first transaction and the second transaction may not be the same. Thus, because there may be differences in the transaction attributes, there can exist a possibility that the first transaction and the second transaction are not actually the same transaction. The decision engine 104*a* can determine, based on a confidence score for the first transaction and the second transaction generated by the confidence model 132, whether to request additional data for the second transaction from the affiliate system 120*a* using a common transaction ID.

In some aspects, any of the decision engines 104 can employ a rule-based algorithm for determining whether to take an action related to a particular transaction, using a common transaction ID, based on the confidence score generated by the confidence model 132. For example, the decisions engine 104*d* may compare the confidence score generated by the confidence model 132 to a predetermined threshold. If the confidence score satisfies (e.g., exceeds) the predetermined threshold, then the decision engine 104*d* may request transaction-related data from the affiliate system 120*a* using a common transaction ID generated by the CTID generator 102. If the confidence score does not satisfy the predetermined threshold, then the decision engine 104*d* may prevent communications for transferring transaction-related data using the common transaction ID for the transaction corresponding to the confidence score.

In some aspects, the predetermined threshold employed by any of the decision engines 104 can be adjusted based on the value of the corresponding transaction. For example, a decision engine 104 may require the confidence score to satisfy a higher predetermined threshold for transactions above a predetermined value compared to the predetermined threshold it requires for transactions below the predetermined value. As another example, a decision engine 104 may set multiple different predetermined thresholds that increase based on transaction value. As yet another example, a decision engine 104 can adjust the predetermined threshold based on other transaction-related factors (e.g., based on which entity of the payment network system 100 the request for transaction-related data is to be sent using the common transaction ID).

In some aspects, any of the decision engines 104 may consider additional factors in determining whether to take an action related to a particular transaction using a common transaction ID. In one aspect, a decision engine 104 may consider the transaction attributes that are present and/or absent in the transaction data used by the confidence model 132 to generate the confidence score. For example, transaction attributes for a first transaction processed by the transaction service provider system 110 and transaction attributes for a second transaction processed by the affiliate system 120*a* may both include a transaction service provider ID. If the transaction service provider IDs are the same, it may be a strong indicator that the first transaction and the second transaction are the same transaction. Thus, the decision engine 104*d* can determine to take action (e.g., request transaction-related data from the affiliate system 120*a*) using the common transaction ID based on the transaction attributes present in the data analyzed by the confidence model 132.

In some aspects, any of the decisions engines 104 may have a different configuration than the other decision engines 104. For example, compared to the affiliate system 120*b*, the affiliate system 120*a* may be willing to accept more risk when requesting transaction-related data based on a common transaction ID. Thus, the decision engine 104*a* of the affiliate system 120*a* may employ different (e.g., lower) predetermined threshold(s) compared to the decision engine 104*b* of the affiliate system 120*b*.

Referring still to FIG. 1, the transaction service provider system 110 and any one or more than one of the affiliate systems 120 can include a fraud model 108 (e.g., fraud model 108*a*, fraud model 108*b*, fraud model 108*c*, fraud model 108*d*; sometimes collectively referred to as the fraud models 108). The transaction service provider system 110 and the affiliate systems 120 can employ their respective fraud models 108 to predict whether a transaction is fraudulent. For example, any of the fraud models 108 can employ fraud detection rules and/or a machine-learning-based model to analyze transaction data corresponding to a transaction and generate a risk score for the transaction. The risk score can indicate a likelihood that the transaction is fraudulent. The risk score can be a numeric value (e.g., 0-100, 0.0-1.0) indicating the probability that the transaction is fraudulent.

The various fraud models 108 employed by the entities of the payment network system 100 may have varying levels of accuracy. For example, the fraud model 108*a* may be better at detecting certain types of fraud compared to the fraud model 108*b*. Accordingly, it may be beneficial for the entities of the payment network system 100 to share, compare, and/or otherwise consider risk scores generated by the fraud models 108 of other entities when processing transactions. For example, when processing a transaction, the transaction service provider system 110 may request that the affiliate system 120*a* send the risk score generated by its fraud model 108*a* for the same transaction by referencing the common transaction ID. The transaction service provider system 110 may determine whether to approve or deny the transaction based on the risk score generated by its own fraud model 108*d* and/or the risk score generated by the fraud model 108*a* of the affiliate system 120*a*.

Referring still to FIG. 1, the transaction service provider system 110 and each of the affiliate systems 120 can include a database 106 (e.g., database 106*a*, database 106*b*, database 106*c*, database 106*d*; sometimes collectively referred to as the databases 106). The transaction service provider system 110 and each of the affiliate systems 120 can store transaction-related data in their respective databases 106. In some aspects, the affiliate systems 120 may store different types of data in their databases 106 compared to the types of data stored in the database 106*d* of transaction service provider system 110. For example, the affiliate system 120*a* may be a payment gateway system (e.g., payment gateway system 2002, FIG. 5). Thus, the affiliate system 120*a* may store more detailed information related to its client merchants compared to merchant-related information stored in the database 106*d* of transaction service provider system 110. This more detailed information can include, for example, parent-subsidiary organizational relationships of various merchants that are not included in the database 106*d*.

Accordingly, using common transaction IDs, the transaction service provider system 110 can request merchant information from the affiliate system 120*a* and use the requested merchant information to update its database 106*a* to include the parent-subsidiary organizational relationships.

FIG. 2 is a flow diagram of a method 200 for implementing an action 214 based on a common transaction ID 206, according to at least one aspect of the present disclosure. For illustrative purposes, the method 200 is described below with reference to the affiliate system 120*a* and the affiliate system 120*b*. However, the method 200 can be implemented by any one or any combination of the entities of the payment network system 100, such as, for example, the confidence system 130, the transaction service provider system 110, and/or any of the affiliate systems 120 (FIG. 1).

Referring primarily to FIG. 2, together with FIG. 1, the affiliate system 120*a* can receive first transaction attributes 204*a* for a first transaction to be processed by the affiliate system 120*a*. The affiliate system 120*b* can receive second transaction attributes 204*b* for a second transaction to be processed by the affiliate system 120*b*. The first transaction attributes 204*a* and the second transaction attributes 204*b* can be collectively referred to or otherwise included in transaction data 202.

The transaction data 202 can be sent to the confidence system 130. Based on the transaction data 202, the confidence system 130 (e.g., the confidence model 132) can generate a confidence score 208. The confidence score 208 can indicate a likelihood (e.g., a probability) that the first transaction and the second transaction are the same transaction. The types of transaction attributes included in the first transaction attributes 204*a* may be different than the types of attributes included in the second transaction attributes 204*b*. For example, the first transaction attributes 204*a* and the second transaction attributes 204*b* can have many common types of transaction attributes, but one or more than one of the types of transaction attributes included in the first transaction attributes 204*a* may not be present in the second transaction attributes 204*b*. In some aspects, the confidence model 132 of the confidence system 130 can generate the confidence score based on the types of attributes that are common to both the first transaction attributes 204*a* and the second transaction attributes 204*b*.

Based on the transaction data 202, the confidence system 130 can determine score attributes 210. As noted above, the types of transaction attributes included in the first transaction attributes 204*a* may be different than the types of attributes included in the second transaction attributes 204*b*. The score attributes 210 can comprise an indication of which types of attributes are included in both the first transaction attributes 204*a* and the second transaction attributes 204*b* and/or which types of attributes are included in only one of the first transaction attributes 204*a* or the second transaction attributes 204*b*.

Referring still primarily to FIG. 2, together with FIG. 1, the decision engine 104 (e.g., the decision engine 104*a* of the affiliate system 120*a*) can receive the confidence score 208 and/or the score attributes 210. Based on the confidence score 208 and/or the score attributes 210, the decision engine 104 can generate a decision 212. For example, the decision engine can determine if the confidence score 208 satisfies (e.g., exceeds) a predetermined threshold, such as a transaction-value dependent predetermined threshold, as explained further herein.

The decision engine 104 can cause the implementation of an action 214 based on the decision 212. For example, the decision engine 104 may determine that the confidence score 208 satisfies the predetermined threshold. Based on the confidence score 208 satisfying the predetermined threshold, the decision 212 can comprise an approval to send and/or receive data related to the corresponding transaction based on a common transaction ID 206. Further, based on the decision 212 including the approval, the decision engine 104 can implement an action 214 that includes sending and/or receiving data related to the corresponding transaction based on a common transaction ID 206 (e.g., the affiliate system 120*a* sending data to and/or receiving data from the affiliate system 120*b* based on the common transaction ID 206). As another example, the decision engine 104 may determine that the confidence score 208 does not satisfy the predetermined threshold. Based on the confidence score 208 not satisfying the predetermined threshold, the decision 212 can comprise a denial related to sending and/or receiving data related to the corresponding transaction based on a common transaction ID 206. Further, based on the decision 212 including the denial, the decision engine 104 can implement an action 214 that includes preventing the sending and/or receiving of data related to the corresponding transaction based on the common transaction ID 206.

Referring still primarily to FIG. 2, together with FIG. 1, the transaction data 202, or at least a portion thereof, can be sent to the CTID generator 102 to generate the common transaction ID 206. For example, the affiliate system 120*a* can send the first transaction attributes 204*a* to the CTID generator 102 for generating the common transaction ID 206. As another example, the affiliate system 120*b* can send the second transaction attributes 204*b* to the CTID generator 102 for generating the common transaction ID 206.

In some aspects, the action 214 can include requesting a risk score, receiving the risk score, and approving or denying a transaction being processed based on the risk score. For example, as noted above, the affiliate system 120*b* can include a fraud model 108*b* to generate a risk score indicating the likelihood that a transaction is fraudulent. The action 214 can include requesting, by the affiliate system 120*a*, sending by the affiliate system 120*b* the risk score generated by the fraud model 108*b*. The request can reference the common transaction ID 206 for the transaction. The action 214 can further include, receiving, by the affiliate system 120*a*, the risk score generated by the fraud model 108*b* for the transaction and approving or denying, by the affiliate system 120*a*, the transaction based on the risk score. In various aspects, the method 200 can occur in real time while the transaction is processed. Thus, entities of the payment network system 100 can approve and/or deny a transaction, as the transactions are being processed, based on information shared using the common transaction ID 206.

Referring still primarily to FIG. 2, together with FIG. 1, according to some aspects of the method 200, various outputs generated by implementing the method 200 are used as training data to update the confidence model 132. For example, for a given set (e.g., pair) of transactions analyzed by the confidence system 130 and the decision engine 104, the transaction data 202, the confidence score 208, the score attributes 210, and/or the decision 212 may be used as training data 216 to update the confidence model 132.

FIG. 3 is a flow diagram of a method 300 for training a confidence model, according to at least one aspect of the present disclosure. The method 300 may be implemented by the confidence system 130 to update the confidence model 132 (FIG. 1).

Referring primarily to FIG. 3, together with FIG. 1, according to the method 300, the confidence model 132 can be trained using training data 302. Initially, to train the confidence mode, the training data 302 can include historical transaction data from any or all of the entities of the payment network system 100. For example, the training data could include sets of transaction attributes (e.g., the first transaction attributes 304*a* and the second transaction attributes 304*b*), with each set corresponding to transaction data from at least two entities of the payment network system 100. Each of the sets may be labeled as either corresponding to the same transaction or not corresponding to the same transaction. Thus, based on historical transaction data, the confidence model 132 can be trained to generate a confidence score indicating the likelihood that first transaction attributes 304*a* and second transaction attributes 304*b* respectively received from two different entities of the payment network system 100 correspond to the same transaction.

Furthermore, according to the method 300, for each set of transaction attributes that are analyzed, the confidence system 130 can be configured to output score attributes 306. For example, in the training data 302, the types of transaction attributes included in the first transaction attributes 304*a* may be different than the types of attributes included in the second transaction attributes 304*b*. The score attributes 306 can comprise an indication of which types of attributes are included in both the first transaction attributes 304*a* and the second transaction attributes 304*b* and/or which types of attributes are included in only one of the first transaction attributes 304*a* or the second transaction attributes 304*b*.

According to some aspects of the method 300, the confidence system 130 can create a common client ID (CCID) 314 in cases where an attribute is missing from one of the sets of transaction attributes in the training data 302. For example, the first transaction attributes 304*a* may be missing a type of transaction attribute that is included in the second transaction attributes 304*b*. A CCID 314 may be generated based on the attribute missing in the first transaction attributes 304*a*.

According to some aspects of the method 300, the confidence system 130 can create a CCID 314 in cases where a new type of attribute is included in the training data 302. For example, some entities of the payment network system 100 may employ different types of transaction attributes when processing a transaction. Thus, the first transaction attributes 304*a* and/or the second transaction attributes 304*b* may include a new type of transaction attributes not recognized by the confidence system 130. A CCID 314 may be generated based on the new type of attribute in the first transaction attributes 304*a* and/or the second transaction attributes 304*b*.

Referring primarily to FIG. 3, together with FIG. 1, according to the method 300, the confidence model 132 can be updated and/or retrained. In some aspects, the updates may occur periodically (e.g., once a month, once a day). In some aspects, the updates may be based on outputs from the method 200 (FIG. 2).

For example, referring again to FIG. 2, as noted above, the training data 216 may be generated based on the transaction data 202, the confidence score 208, the score attributes 210, and the decision 212 output as a result of the method 200. Referring now primarily to FIG. 3, the training data 216 may be fed into the confidence system as the training data 302. Thus, the training data 302 can include a confidence score 308, score attributes 310, a decision 312, first transaction attributes 304*a*, and second transaction attributes 304*b* respectively corresponding to the confidence score 208, the score attributes 210, the decision 212, the first transaction attributes 204*a*, and the second transaction attributes 204*b* employed and/or generated by the method 200. The training data 302 can be applied to update the confidence model 132.

Accordingly, the confidence model 132 can be updated and/or retrained based on transaction data 202 processed by various entities of the payment network system 100. Furthermore, the updated confidence model 132 can be redeployed to process new transaction data 202, which, according to the method 200, can be used to generate new training data 216, which can be applied as training data 302 to further update the confidence model 132 according to the method 300. Thus, the confidence model 132 can be updated in an iterative manner, using a feedback loop, as new transaction data 202 is processed.

FIG. 4 is a flow diagram of a method 400 for multiple entities of a payment network to implement an action based on a common transaction ID, according to at least one aspect of the present disclosure. The method 400 can be implemented by various entities of the payment network system 100 (FIG. 1). Although FIG. 4 depicts the method 400 implemented by the affiliate system 120*a*, the affiliate system 120*b*, the affiliate system 120*c*, and the transaction service provider system 110, the method 400 may be implemented by any number of entities of the payment network system 100. The method 400 may be similar in many respects to the method 200 (FIG. 2). Thus, any of the aspects disclosed herein with respect to the method 200 can similarly apply to the method 200 and vice versa.

Referring primarily to FIG. 4, together with FIG. 1, according to the method 400, transaction data can be applied to the confidence system 130. The transaction data 402 can include first transaction attributes for a first transaction processed by the affiliate system 120*a*, second transaction attributes for a second transaction processed by the affiliate system 120*b*, third transaction attributes for a third transaction processed by the affiliate system 120*c*, and fourth transaction attributes for a fourth transaction processed by the transaction service provider system 120*d*. The confidence system 130 can generate a confidence score 408 indicating a likelihood (e.g., a probability) that the first transaction, the second transaction, the third transaction, and the fourth transaction are the same transaction. For illustrative purposes, the generated confidence score 408 may be 97, for example.

Referring still primarily to FIG. 4, together with FIG. 1, according to the method 400, the confidence score 408 can be sent to each of the affiliate system 120*a*, the affiliate system 120*b*, the affiliate system 120*c*, and the transaction service provider system 110. As noted here with respect to FIGS. 1 and 2, the entities of the payment network system 100 may employ a decision engine 104 to generate a decision that includes an approval or denial related to sending and/or receiving data for a particular transaction using a common transaction ID (CTID) 406 based on the corresponding confidence score 408. Further, as noted herein, each entity's decision engine 104 may employ different predetermined thresholds that the confidence score 408 must satisfy for the decision engine 104 to generate a decision of approval for sending and/or receiving data using a common transaction ID 406. For example, for illustrative purposes, the affiliate system 120*a* may employ a predetermined threshold of 95, the affiliate system 120*b* may employ a predetermined threshold of 98, the affiliate system 120*c* may employ a predetermined threshold of 80, and the transaction service provider system 110 may employ a predetermined threshold of 96. Thus, the confidence score of 97 may satisfy the predetermined thresholds for the affiliate system 120*a* (95), the affiliate system 120*c* (80), and the transaction service provider system 110 (96) but not the predetermined threshold for the affiliate system 120*b* (98). Thus, the decision 412*a*, the decision 412*c*, and the decision 412*d* respectively generated by the decision engines 104 of the affiliate system 120*a*, the affiliate system 120*c*, and the transaction service provider system 110 may include an approval to receive transaction-related data from other entities using the common transaction ID 406. The affiliate system 120*a*, the affiliate system 120*c*, and the transaction service provider system 110 can therefore respectively implement the action 414*a*, the action 414*c*, and the action 414*d* to request and receive data based on the common transaction ID 406. However, the decision 412*b* generated by the decision engine 140*b* of the affiliate system 120*b* may include a denial to receive transaction-related data from other entities using the common transaction ID 406. Accordingly, the action 414*c* can include preventing the data to be received by the affiliate system 120*c* based on the common transaction ID 406.

FIG. 5 is a diagram of a payment network system 2000 across which transactions may be executed and across which transaction-related data may be shared between entities based on a common transaction ID, according to at least one aspect of the present disclosure. As shown in FIG. 5, the payment network system 2000 can include a payment gateway system 2002, an access device 2004, a payment device 2006, an issuer system 2008, a transaction service provider system 2010, an acquirer system 2012, a network 2014, other affiliate system(s) 2020, and a confidence system 2030. The payment gateway system 2002, the access device 2004, the payment device 2006, the issuer system 2008, the transaction service provider system 2010, the acquirer system 2012, the other affiliate system(s) 2020, and/or the confidence system 2030 may interconnect (e.g., establish a connection to communicate) via wired connections, wireless connections, or a combination of wired and wireless connections. In some aspects, the payment network system 2000 is similar to the payment network system 100 (FIG. 1). Any aspects described herein with respect to the payment network system 100 can similarly apply to the payment network system 2000 and vice versa.

Referring again to FIG. 5, the access device 2004 may include one or more devices capable of receiving information from and/or transmitting information to the payment gateway system 2002, the payment device 2006, the issuer system 2008, the transaction service provider system 2010, the acquirer system 2012, the other affiliate system(s) 2020, and/or the confidence system 2030 via the network 2014. The access device 2004 may be any suitable device that provides access to a remote system. The access device 2004 also may be used for communicating with a merchant computer, a transaction processing computer, an authentication computer, or any other suitable system. The access device 2004 may generally be located in any suitable location, such as at the location of a merchant. The access device 2004 may be in any suitable form. Some examples of the access device 2004 can include POS or point-of-sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. The access device 2004 may use any suitable contact or contactless mode of operation to send or receive data from, or associated with, the payment device 2006. For example, the access device 2004 may include a reader, a processor, and a computer-readable medium. A reader can include a radio frequency (RF) antenna, an optical scanner, a bar code reader, and/or a magnetic stripe readers to interact with the payment device 2006.

As noted above, in some aspects, the access device 2004 can comprise a point-of-sale (POS) device. The POS device may include one or more than one device, such as a computer, a computer system, a portable electronic device, and/or a peripheral device capable of being used by a merchant to conduct a payment transaction with a user, for example, using the payment device 2006. In some aspects, the POS device may be a component of a merchant system associated with a merchant. In some aspects, the POS device can be configured to receive information from the payment device 2006 via a communication connection (e.g., a near field communication (NFC) connection, a radio-frequency identification (RFID) communication connection, a Bluetooth® communication connection, and/or the like) and/or transmit information to the payment device 2006 via the communication connection.

A "merchant" may refer to one or more individuals or entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein "merchant system" may refer to one or more computer systems operated by or on behalf of a merchant, such as a server computer executing one or more software applications.

A "user" may include an individual. In some embodiments or aspects, a user may be associated with one or more personal accounts, payment cards, and/or portable electronic devices. The user also may be referred to as a cardholder, account holder, or consumer.

Referring again to FIG. 5, the payment device 2006 can include any device that may be used to conduct a transaction, such as a financial transaction. For example, a payment device 2006 may be used to provide payment information to a merchant. In some aspects, the payment device 2006 can be a computing device. In some aspects, the payment device 2006 can be a payment card and can include a substrate such as a paper, metal, or plastic card, and information that is printed, embossed, encoded, and/or otherwise included at or near a surface of the payment card. The payment device 2006 can be hand-held and compact so that it can fit into a consumer's wallet and/or pocket (e.g., pocket-sized). The payment device 2006 can be a smart card, a debit device (e.g., a debit card), a credit device (e.g., a credit card), a stored value device (e.g., a stored value card or "prepaid" card), or a magnetic stripe or chip card. The payment device 2006 may operate in a contact and/or contactless mode. For example, the payment device 2006 may be an electronic payment device, such as a smart card, a chip card, an integrated circuit card, and/or a near field communications (NFC) card, among others. The payment device 2006 may include an embedded integrated circuit. The embedded integrated circuit may include a data storage medium (e.g., volatile and/or non-volatile memory) to store information associated with the payment device 2006, such as an account identifier and/or a name of an account holder. The payment device 2006 may interface with the access device 2004 to initiate a transaction.

Referring still to FIG. 5, the payment gateway system 2002 may include one or more devices capable of receiving information from and/or transmitting information to the access device 2004, the issuer system 2008, the transaction service provider system 2010, the acquirer system 2012, the other affiliate system(s) 2020, and/or the confidence system 2030 via the network 2014. For example, the payment gateway system 2002 may include a computing device, such as a server (e.g., a transaction processing server), a group of servers, and/or other like devices. The payment gateway system 2002 may refer to an entity and/or a payment processing system operated by or on behalf of such an entity (e.g., a merchant service provider, a payment service provider (PSP), a payment facilitator, a payment facilitator that contracts with an acquirer, a payment aggregator, and/or the like), which provides payment services (e.g., transaction service provider payment services, payment processing services, and/or the like) to one or more merchants. In some aspects, the payment gateway system 2002 can be similar to any of the affiliate systems 120 (FIG. 1). Any aspects described herein with respect to the affiliate systems 120 can similarly apply to the payment gateway system 2002 and vice versa.

Referring still to FIG. 5, the acquirer system 2012 may include one or more devices capable of receiving information from and/or transmitting information to the payment gateway system 2002, the access device 2004, the issuer system 2008, the transaction service provider system 2010, the other affiliate system(s) 2020, and/or the confidence system 2030 via the network 2014. For example, the acquirer system 2012 may include a computing device, such as a server, a group of servers, and/or other like devices. In some aspects, the acquirer system 2012 may be associated with an acquirer. In some aspects, the acquirer system 2012 may be associated with a merchant account of a merchant associated with the access device 2004. In some aspects, the acquirer system 2012 can be similar to any of the affiliate systems 120 (FIG. 1). Any aspects described herein with respect to the affiliate systems 120 can similarly apply to the acquirer system 2012 and vice versa.

An "acquirer" may refer to an entity licensed by a transaction service provider and/or approved by a transaction service provider to originate transactions (e.g., payment transactions) using a portable financial device associated with the transaction service provider. "Acquirer" or "acquirer system" may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider.

Referring again to FIG. 5, the transaction service provider system 2010 may include one or more devices capable of receiving information from and/or transmitting information to the payment gateway system 2002, the access device 2004, the issuer system 2008, the acquirer system 2012, the other affiliate system(s) 2020, and/or the confidence system 2030 via the network 2014. For example, the transaction service provider system 2010 may include a computing device, such as a server (e.g., a transaction processing server), a group of servers, and/or other like devices. In some aspects, the transaction service provider system 2010 may be associated with a transaction service provider. In some aspects, the transaction service provider system 2010 may be in communication with a data storage device, which may be local or remote to the transaction service provider system 2010. In some aspects, the transaction service provider system 2010 may be capable of receiving information from, storing information in, transmitting information to, or searching information (e.g., transaction data) stored in a data storage device. In some aspects, the transaction service provider system 2010 can be similar to the transaction service provider system 110 (FIG. 1). Any aspects described herein with respect to the transaction service provider system 110 can similarly apply to the transaction service provider system 2010 and vice versa.

Referring again to FIG. 5, the issuer system 2008 may include one or more devices capable of receiving information from and/or transmitting information to payment gateway system 2002, the access device 2004, transaction service provider system 2010, the acquirer system 2012, the other affiliate system(s) 2020, and/or the confidence system 2030 via the network 2014. For example, the issuer system 2008 may include a computing device, such as a server, a group of servers, and/or other like devices. In various aspects, the issuer system 2008 may be associated with an issuer institution. For example, the issuer system 2008 may be associated with an issuer institution that issued a credit account, debit account, credit card account, debit card account, and/or the like to a user associated with the payment device 2006. In some aspects, the issuer system 2008 can be similar to any of the affiliate systems 120 (FIG. 1). Any aspects described herein with respect to the affiliate systems 120 can similarly apply to the issuer system 2008 and vice versa.

The terms "issuer institution," "portable financial device issuer," "issuer," or "issuer bank" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions), such as initiating credit and/or debit payments. For example, an issuer may provide an account identifier, such as a personal account number (PAN), to a user that uniquely identifies one or more accounts associated with the user. The account identifier may be used by the user to conduct a payment transaction. The account identifier may be embodied on a portable financial device, such as a physical financial instrument (e.g., a payment card) and/or may be electronic and used for electronic payments. As used herein "issuer system" or "issuer institution system" may refer to one or more systems operated by or operated on behalf of an issuer. For example, an issuer system may refer to a server executing one or more software applications associated with the issuer. In some non-limiting aspects of the present disclosure, an issuer system may include one or more servers (e.g., one or more authorization servers) for authorizing a payment transaction. An "issuer" can include a payment account issuer. The payment account (which may be associated with one or more payment devices) may refer to any suitable payment account (e.g., credit card account, a checking account, a savings account, a merchant account assigned to a consumer, or a prepaid account), an employment account, an identification account, an enrollment account (e.g., a student account), etc.

Referring again to FIG. 5, the other affiliate system(s) 2020 may include one or more devices capable of receiving information from and/or transmitting information to the payment gateway system 2002, the access device 2004, the transaction service provider system 2010, the acquirer system 2012, and/or the confidence system 2030 via the network 2014. The other affiliate system(s) 2020 can be any system involved in processing transactions across the payment network system 2000, such as for example, other issuer systems, other acquirer systems, other payment gateway systems, authentication service provider systems, and/or merchant systems. In some aspects, the other affiliate system(s) 2020 can be similar to any of the affiliate systems 120 (FIG. 1). Any aspects described herein with respect to the affiliate systems 120 can similarly apply to the other affiliate system(s) 2020 and vice versa.

Referring still to FIG. 5, the confidence system 2030 may include one or more devices capable of receiving information from and/or transmitting information to the payment gateway system 2002, the access device 2004, the issuer system 2008, the transaction service provider system 2010, the acquirer system 2012, and/or the other affiliate system(s) 2020 via the network 2014. In some aspects, the confidence system 2030 may be included in any one or more of the payment gateway system 2002, the issuer system 2008, the transaction service provider system 2010, the acquirer system 2012, and/or the other affiliate system(s) 2020. The confidence system 2030 can receive and analyze data corresponding to transactions executed across the payment network system 2000 and generate a confidence score indicating the likelihood that any two or more than two transactions are the same transaction. The payment gateway system 2002, the access device 2004, the issuer system 2008, the transaction service provider system 2010, the acquirer system 2012, and/or the other affiliate system(s) 2020 may implement an action (e.g., request additional transaction-related data from another entity) based on a confidence score generated by the confidence system 2030. In some aspects, the confidence system 2030 can be similar to the confidence system 130 (FIG. 1). Any aspects described herein with respect to the confidence system 130 can similarly apply to the confidence system 2030 and vice versa.

Referring still to FIG. 5, the network 2014 may include one or more wired and/or wireless networks. For example, the network 2014 may include a cellular network (e.g., a long-term evolution (LTE) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices, systems, and networks shown in the payment network system 2000 of FIG. 5 are provided as an example. There may be additional devices, systems, and/or networks, fewer devices, systems, and/or networks, different devices, systems, and/or networks, or differently arranged devices, systems, and/or networks than those shown in FIG. 5. Furthermore, two or more systems shown in FIG. 5 may be implemented within a single system and/or device, or a single system shown in FIG. 5 may be implemented as multiple, distributed devices and/or systems. Additionally or alternatively, a set of devices (e.g., one or more devices) of the payment network system 2000 may perform one or more functions described as being performed by another set of devices of the payment network system 2000.

FIG. 6 is a flow diagram of a method 600 for sharing transaction-related data based on a common transaction ID, according to at least one aspect of the present disclosure. In some aspects, the method 600 can be performed by a transaction service provider system, such as the transaction service provider system 110 (FIG. 1), as explained further below. In other aspects, the method can be performed by an affiliate system, such as the affiliate system 120 (FIG. 1).

Referring primarily to FIG. 6, and also to FIG. 1, according to the method 600, the transaction service provider system 110 retrieves 602 first transaction attributes. The first transaction attributes can correspond to a first transaction being processed by the transaction service provider system 110. Further, the transaction service provider system 110 (e.g., a confidence system 130 included in the transaction service provider system 110) can receive 604 second transaction attributes from an affiliate system 120. The second transaction attributes can correspond to a second transaction being processed by the affiliate system 120.

Referring still primarily to FIG. 6, and also to FIG. 1, according to the method 600, the transaction service provider system 110 can generate 606 a confidence score by applying the first transaction attributes and the second transaction attributes to a confidence model 132. The confidence score can represent a likelihood that the first transaction and the second transaction are the same transaction. Further, the transaction service provider system 110 can accept 608 that the first transaction and the second transaction are the same transaction based on the confidence score satisfying a predetermined threshold.

Referring still primarily to FIG. 6, and also to FIG. 1, according to the method 600, the transaction service provider system 110 (e.g., a CTID generator 102 of the transaction service provider system 110) can generate 610 a common transaction ID for the first transaction and the second transaction by applying the first transaction attributes or the second transaction attributes or a combination thereof to a hashing algorithm. Further, the transaction service provider system 110 can send 612 a request for additional data related to the second transaction to the affiliate system 120 based on the common transaction ID. For example, the request can reference the common transaction ID.

According to some aspects of the method 600, the transaction service provider system 110 receives the additional data related to the second transaction from the affiliate system 120. The additional data can include a risk score for the second transaction. The transaction service provider system 110 can approve or deny, in real time, the first transaction based on the risk score for the second transaction.

According to some aspects of the method 600, the affiliate system 120 is a payment gateway system (e.g., the payment gateway system 2002). According to other aspects of the method 600, the affiliate system 120 is an authentication service provider system. According to other aspects of the method 600, the affiliate system 120 is an issuer system (e.g., the issuer system 2008). According to other aspects of the method 600, the affiliate system 120 is an acquirer system (e.g., the acquirer system 2012).

According to some aspects, the method 600 further includes training the confidence model 132 via supervised learning using labeled data. The labeled data can include transaction attributes from the transaction service provider system 110 and the affiliate system 120 known to correspond to the same transaction.

According to some aspects of the method 600, the first transaction attributes and the second transaction attributes define types of attributes. Types of attributes can include a primary account number (PAN), a transaction amount, a currency, a date and time, an authentication code, a transaction service provider transaction identifier (ID), or a merchant code, or a combination thereof. In one aspect, accepting 608 that the first transaction and the second transaction are the same transaction is based on the types of attributes defined by the first transaction attributes and the second transaction attributes. In another aspect, a first attribute of the first transaction attributes is different from a second attribute of the second transaction attributes, wherein the first attribute and the second attribute are the same type of attribute.

According to some aspects of the method 600, the predetermined threshold is a first predetermined threshold. Further, the first transaction attributes comprise a transaction amount. In these aspects of the method 600, accepting 608 that the first transaction and the second transaction are the same transaction is based on the transaction amount satisfying a second predetermined threshold.

FIG. 7 is a block diagram of a computer apparatus 3000 comprising data processing subsystems or components, according to at least one aspect of the present disclosure. The subsystems shown in FIG. 7 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

FIG. 8 is a diagrammatic representation of an example computing system 4000 that includes a host machine 4002 within which a set of instructions to implement any one or more the systems, components, and/or methodologies discussed herein, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to the corresponding vNode 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multiprocessor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4028 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the devices, systems, and methods according to various aspects of the present disclosure are provided below in the following numbered clauses. An aspect of any of the devices(s), method(s) and/or system(s) may include any one or more than one, and any combination of, the numbered clauses described below.

Clause 1: A computer-implemented method, comprising: retrieving, by a first server, first transaction attributes, wherein the first transaction attributes correspond to a first transaction being processed by the first server; receiving, by the first server, second transaction attributes from a second server, wherein the second transaction attributes correspond to a second transaction being processed by the second server; generating, by the first server, a confidence score by applying the first transaction attributes and the second transaction attributes to a machine learning model, wherein the confidence score represents a likelihood that the first transaction and the second transaction are the same transaction; accepting, by the first server, that the first transaction and the second transaction are the same transaction based on the confidence score satisfying a predetermined threshold; generating, by the first server, a common transaction identifier (ID) for the first transaction and the second transaction by applying the first transaction attributes or the second transaction attributes or a combination thereof to a hashing algorithm; and sending, by the first server, a request for additional data related to the second transaction to the second server, wherein the request references the common transaction ID.

Clause 2: The computer-implemented method of Clause 1, further comprising: receiving, by the first server, the additional data related to the second transaction from the second server, wherein the additional data comprises a risk score for the second transaction; and approving or denying, in real time, by the first server, the first transaction based on the risk score for the second transaction.

Clause 3: The computer-implemented method of any of Clauses 1-2, wherein one of the first server or the second server is a transaction service provider server, and wherein the other one of the first server or the second server is an affiliate server.

Clause 4: The computer-implemented method of Clause 3, wherein the affiliate server is a payment gateway server.

Clause 5: The computer-implemented method of Clause 3, wherein the affiliate server is an authentication service provider server.

Clause 6: The computer-implemented method of any of Clauses 1-5, further comprising training the machine learning model via supervised learning using labeled data, wherein the labeled data comprises transaction attributes from the first server and the second server known to correspond to the same transaction.

Clause 7: The computer-implemented method of any of Clauses 1-6, wherein the first transaction attributes and the second transaction attributes define types of attributes, wherein the types of attributes comprise a primary account number (PAN), a transaction amount, a currency, a date and time, an authentication code, a transaction service provider transaction identifier (ID), or a merchant code, or a combination thereof.

Clause 8: The computer-implemented method of Clause 7, wherein a first attribute of the first transaction attributes is different from a second attribute of the second transaction attributes, wherein the first attribute and the second attribute are the same type of attribute.

Clause 9: The computer-implemented method of any of Clauses 1-8, wherein the predetermined threshold is a first predetermined threshold, wherein the first transaction attributes comprise a transaction amount, and wherein accepting that the first transaction and the second transaction are the same transaction is further based on the transaction amount satisfying a second predetermined threshold.

Clause 10: The computer-implemented method of any of Clauses 1-9, wherein accepting that the first transaction and the second transaction are the same transaction is further based on the types of attributes defined by the first transaction attributes and the second transaction attributes.

Clause 11: A transaction service provider system, comprising: a confidence model to: receive first transaction data for a first transaction being processed by the transaction service provider system; receive second transaction data for a second transaction being processed by an affiliate system; and generate a confidence score based on the first transaction data and the second transaction data; wherein the confidence score represents a likelihood that the first transaction and the second transaction are the same transaction; a common transaction ID generator to: generate a common transaction ID for the first transaction and the second transaction based on the first transaction data; and a decision engine to: determine the confidence score satisfies a predetermined threshold; and send a request for additional data related to the second transaction to the affiliate system, wherein the request comprises the common transaction ID.

Clause 12: The transaction service provider system of Clause 11, further comprising: a fraud model to: receive the first transaction data; generate a first fraud score for the first transaction; receive the additional data related to the second transaction from the affiliate system, wherein the additional data comprises a second fraud score for the second transaction; and approve or deny the first transaction based on the first fraud score and the second fraud score.

Clause 13: The transaction service provider system of any of Clauses 11-12, wherein the confidence model comprises a machine learning model trained via supervised learning using labeled data.

Clause 14: The transaction service provider system of any of Clauses 11-13, wherein the first transaction data and the second transaction data each comprise transaction attributes, and wherein the transaction attributes comprise a primary account number (PAN), a transaction amount, a currency, a date and time, an authentication code, a transaction service provider transaction identifier (ID), or a merchant code, or a combination thereof.

Clause 15: The transaction service provider system of Clauses 14, wherein the common transaction ID generator comprises a hashing algorithm to generate the common transaction ID based on the transaction attributes of the first transaction data.

Clause 16: The transaction service provider system of any of Clauses 14-15, wherein the decision engine is to compare the transaction attributes of the first transaction data and the transaction attributes of the second transaction data.

Clause 17: The transaction service provider system of any of Clauses 11-16, wherein the first transaction comprises a first transaction amount, and wherein the predetermined threshold is based on the first transaction amount.

Clause 18: A computer-implemented method, comprising: receiving, by a first affiliate server, a request to process a first transaction from a merchant server, wherein the request comprises first transaction data; sending, by the first affiliate server, the first transaction data to a confidence model; receiving, by the first affiliate server, a confidence score from the confidence model, wherein the confidence score represents a likelihood that the first transaction and a second transaction being processed by a second affiliate server are the same transaction; determining, by the first affiliate server, that the confidence score satisfies a predetermined threshold; generating, by the first affiliate server, a common transaction identification (ID) for the first transaction and the second transaction based on the first transaction data; sending, by the first affiliate server, a request for additional data related to the second transaction to the second affiliate server, wherein the request references the common transaction ID; receiving, by the first affiliate server, the additional data related to the second transaction; approving or denying, by the first affiliate server, the first transaction based on the additional data related to the second transaction.

Clause 19: The computer-implemented method of Clause 18, wherein the additional data related to the second transaction comprises a fraud score for the second transaction.

Clause 20: The computer-implemented method of any of Clauses 18-19, wherein at least one of the first affiliate server and the second affiliate server is a payment gateway server.

Further, it is understood that any one or more of the following-described forms, expressions of forms, examples, can be combined with any one or more of the other following-described forms, expressions of forms, and examples.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

As used herein, a "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, a "server computer" may describe a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support payment network cloud service.

Reference to "a device," "a server," "a processor," and/or the like, as used herein, may refer to a previously recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

The term "substantially," "about," or "approximately" as used in the present disclosure, unless otherwise specified, means an acceptable error for a particular value as determined by one of ordinary skill in the art, which depends in part on how the value is measured or determined. In certain aspects, the term "substantially," "about," or "approximately" means within 1, 2, 3, or 4 standard deviations. In certain aspects, the term "substantially," "about," or "approximately" means within 50%, 20%, 15%, 10%, 9%, 8%, 7%, 6%, 5%, 4%, 3%, 2%, 1%, 0.5%, or 0.05% of a given value or range.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

As used herein, the singular form of "a," "an," and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A computer-implemented method, comprising:

retrieving, by a first server, first transaction attributes, wherein the first transaction attributes correspond to a first transaction being processed by the first server;

receiving, by the first server via a communication network, second transaction attributes from a second server, wherein the second transaction attributes correspond to a second transaction being processed by the second server, wherein the first transaction attributes and the second transaction attributes are generated independently by different entities of a payment network and do not include a shared transaction identifier, and wherein the first transaction attributes and the second transaction attributes include overlapping but non-identical subsets of transaction attributes;

generating, by the first server, a confidence score by applying the first transaction attributes and the second transaction attributes to a trained machine learning model, wherein the trained machine learning model is trained via supervised learning using labeled transaction data, wherein the labeled transaction data comprises transaction attributes for sets of transactions labeled as either corresponding to the same transaction or different transactions, and wherein the confidence score represents a likelihood that the first transaction and the second transaction are the same transaction;

accepting, by the first server, that the first transaction and the second transaction are a common transaction based on the confidence score satisfying a predetermined threshold;

generating, by the first server, a common transaction identifier (ID) for the common transaction by applying the first transaction attributes or the second transaction attributes or a combination thereof to a hashing algorithms wherein the hashing algorithm is shared across the first server and the second server such that the same common transaction ID is independently generatable by each of the first server and the second server for a given set of transaction attributes;

transmitting, by the first server via the communication network, a signal comprising a request for a risk score for the common transaction to the second server, wherein the risk score represents a probability of the common transaction being fraudulent, and wherein the request references the common transaction ID thereby enabling the second server to identify the common transaction by applying the hashing algorithm to the second transaction attributes and independently generating the common transaction ID; and receiving, by the first server via the communication network, a signal comprising the risk score for the common transaction; wherein one of the first server or the second server is a transaction service provider server, and wherein the other one of the first server or the second server is an affiliate server.

2. The computer-implemented method of claim 1, wherein the affiliate server is a payment gateway server.

3. The computer-implemented method of claim 1, wherein the affiliate server is an authentication service provider server.

4. The computer-implemented method of claim 1, further comprising training the machine learning model to output confidence scores representing likelihoods that sets of transactions are the same transaction based on receiving transaction attributes for the sets of transactions at inputs, wherein the training comprises supervised learning using the labeled transaction data, wherein the labeled transaction data is from the first server and the second server.

5. The computer-implemented method of claim 1, wherein the first transaction attributes and the second transaction attributes define types of attributes, wherein the types of attributes comprise a primary account number (PAN), a transaction amount, a currency, a date and time, an authentication code, a transaction service provider transaction identifier (ID), or a merchant code, or a combination thereof.

6. The computer-implemented method of claim 5, wherein a first attribute of the first transaction attributes is different from a second attribute of the second transaction attributes, wherein the first attribute and the second attribute are the same type of attribute.

7. The computer-implemented method of claim 5, wherein the predetermined threshold is a first predetermined threshold, wherein the first transaction attributes comprise a transaction amount, and wherein accepting that the first transaction and the second transaction are the same transaction is further based on the transaction amount satisfying a second predetermined threshold.

8. The computer-implemented method of claim 7, wherein accepting that the first transaction and the second transaction are the same transaction is further based on the types of attributes defined by the first transaction attributes and the second transaction attributes.

9. A transaction service provider system, comprising: a confidence model to:

receive first transaction data for a first transaction being processed by the transaction service provider system;

receive, via a communication network, second transaction data for a second transaction being processed by an affiliate system, wherein the first transaction data and the second transaction data are respectively generated independently by the transaction service provider system and the affiliate system and do not include a shared transaction identifier, wherein the transaction service provider system and the affiliate system are different entities of a payment network, and wherein the first transaction data and the second transaction data include overlapping but non-identical subsets of transaction attributes; and generate a confidence score based on the first transaction data and the second transaction data, wherein the confidence model is a machine learning model trained via supervised learning using labeled transaction data, wherein the labeled transaction data comprises transaction attributes for sets of transactions labeled as either corresponding to the same transaction or different transactions, and wherein the confidence score represents a likelihood that the first transaction and the second transaction are the same transaction;

a common transaction ID generator to:

generate a common transaction ID for the first transaction and the second transaction, wherein the common transaction ID is generated based on applying the first transaction data to a hashing algorithm, and wherein the hashing algorithm is shared across the transaction service provider system and the affiliate system such that the same common transaction ID is independently generatable by each of the transaction service provider system and the affiliate system for a given set of transaction data;

a decision engine to:

accept that the first transaction and the second transaction are a common transaction based on determining the confidence score satisfies a predetermined threshold, wherein the common transaction ID generator generates the common transaction ID in response to the decision engine accepting the first transaction and the second transaction as the common transaction; and transmit, via the communication network, a signal comprising a request for a risk score for the common transaction to the affiliate system, wherein the risk score represents a probability of the common transaction being fraudulent, and wherein the request comprises the common transaction ID thereby enabling the affiliate server to identify the common transaction by applying the hashing algorithm to the second transaction data and independently generating the common transaction ID;

and a fraud model to:

receive the risk score the common transaction from the affiliate system.

10. The transaction service provider system of claim 9, wherein the fraud model is further configured to: approve or deny the first transaction based on a risk score for the first transaction and the risk score for the second transaction.

11. The transaction service provider system of claim 9, wherein the first transaction data and the second transaction data each comprise transaction attributes, and wherein the transaction attributes comprise a primary account number (PAN), a transaction amount, a currency, a date and time, an authentication code, a transaction service provider transaction identifier (ID), or a merchant code, or a combination thereof.

12. The transaction service provider system of claim 11, wherein the decision engine is to compare the transaction attributes of the first transaction data and the transaction attributes of the second transaction data.

13. The transaction service provider system of claim 9, wherein the first transaction comprises a first transaction amount, and wherein the predetermined threshold is based on the first transaction amount.

14. A computer-implemented method, comprising:

receiving, by a first affiliate server via a communication network, a request to process a first transaction from a merchant server, wherein the request comprises first transaction data;

sending, by the first affiliate server, the first transaction data to a confidence model, wherein the confidence model is a machine learning model trained via supervised learning using labeled transaction data, wherein the labeled transaction data comprises transaction attributes for sets of transactions labeled as either corresponding to the same transaction or different transactions, and wherein the confidence model is configured to output confidence scores representing likelihoods that sets of transactions are the same transactions based on receiving transaction data comprising transaction attributes for the sets of transactions as inputs;

receiving, by the first affiliate server, a confidence score for the first transaction and a second transaction being processed by a second affiliate server from the confidence model, wherein the confidence score represents a likelihood that the first transaction and the second transaction are the same transaction, wherein the first transaction data for the first transaction and second transaction data for the second transaction are used by the confidence model to generate the confidence score, wherein the first transaction data and the second transaction data are respectively generated independently by the first affiliate server and the second affiliate server and do not include a shared transaction identifier, wherein the first affiliate server and the second affiliate server are different entities of a payment network, and wherein the first transaction data and the second transaction data include overlapping but non-identical subsets of transaction attributes;

accepting, by the first affiliate server, that the first transaction and the second transaction are a common transaction based on determining that the confidence score satisfies a predetermined threshold;

generating, by the first affiliate server, a common transaction identification (ID) for the common transaction based on the first transaction data, wherein generating the common transaction ID comprises applying the first transaction data or the second transaction data or a combination thereof to a hashing algorithm, and wherein the hashing algorithm is shared across the first affiliate server and the second affiliate server such that the same common transaction ID is independently generatable by each of the first affiliate server and the second affiliate server for a given set of transaction data;

transmitting, by the first affiliate server via the communication network, a signal comprising a request for a risk score for the common transaction to the second affiliate server, wherein the risk score represents a probability of the common transaction being fraudulent, and wherein the request references the common transaction ID thereby enabling the second affiliate server to identify the common transaction by applying the hashing algorithm to the second transaction data and independently generating the common transaction ID; and receiving, by the first affiliate server via the communication network, a signal comprising the risk score for the common transaction.

15. The computer-implemented method of claim 14, wherein at least one of the first affiliate server and the second affiliate server is a payment gateway server.

16. The computer-implemented method of claim 1, further comprising approving or denying, in real time, by the first server, the first transaction based on the risk score.

17. The computer-implemented method of claim 14, further comprising approving or denying by the first affiliate server, the first transaction based on the risk score.

* * * * *